Jan. 30, 1968    J. E. COOK    3,365,797
CUTTING TOOL FOR WOVEN BACKINGS OF SYNTHETIC MATERIAL
Filed Feb. 11, 1966
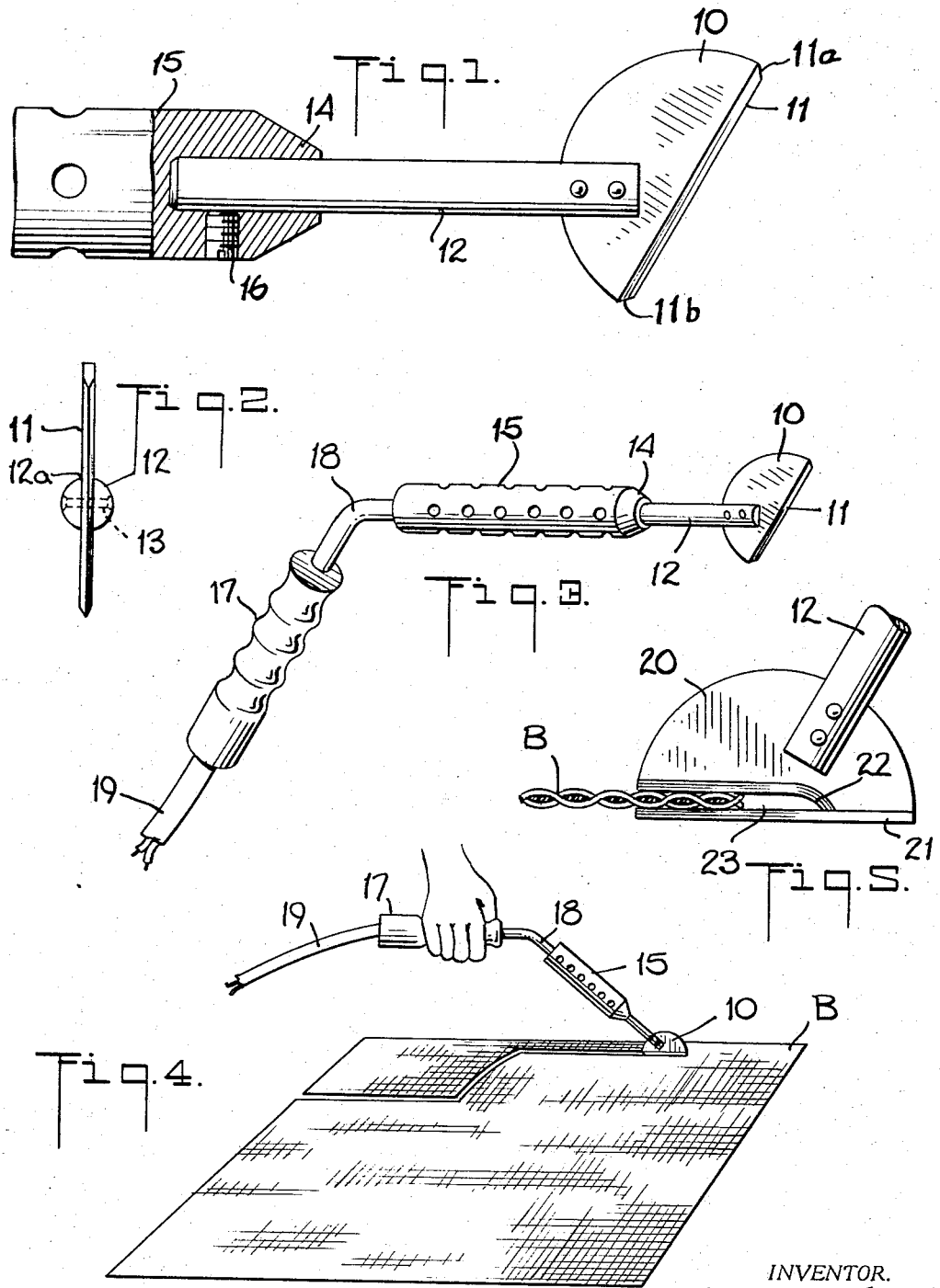
INVENTOR.
JEROME E. COOK
BY
ATTORNEY

United States Patent Office 3,365,797
Patented Jan. 30, 1968

---

3,365,797
CUTTING TOOL FOR WOVEN BACKINGS OF SYNTHETIC MATERIAL
Jerome E. Cook, Rye, N.Y., assignor to Patchogue-Plymouth Company, New York, N.Y., a joint venture
Filed Feb. 11, 1966, Ser. No. 526,833
2 Claims. (Cl. 30—140)

This invention relates generally to cutting tools for woven thermoplastic materials, and more particularly to a tool adapted simultaneously to cut and edge-seal a woven backing formed of synthetic thermoplastic material, and intended for use in a pile fabric wherein pile yarns are tufted in the backing.

In the manufacturing of tufted fabrics, such as carpets and rugs, a woven backing is advanced through a needle tufting machine, the pile yarns being borne on a bank of reciprocating needles which extend transversely across the backing web and pierce the backing material. As the needles are withdrawn, looper members serve to hold the inserted yarns, thereby forming on the moving back, row upon row of pile loops which project above the backing face.

In order to improve the quality of tufted fabrics it has become the recent practice to make use of backings formed of flat or ribbon-like synthetic plastic yarns, rather than the conventional round or twisted yarns of jute, cotton or kraftcord. Among the yarn materials used for this purpose are polypropylene, polyethylene, and other thermoplastic synthetic materials.

Though such backings when fabricated of ribbon-like yarns have distinct advantages over other constructions, some fraying may result when cutting the backing into special shapes and sizes, as for example, when cutting a backing into a circular shape or when trimming the edge of a backing web coming from a weaving machine.

To overcome this condition, it has heretofore been the practice to apply adhesive to the cut edge or to apply a tape thereto, but neither expedient is satisfactory, for the resultant border is not adequately bound and is unsightly.

Accordingly, it is the main object of this invention to provide a cutting and sealing tool which not only acts to sever a backing of synthetic thermoplastic material, but serves at the same time to fuse the cut yarn ends thereof to impart a selvage thereto, thereby preventing unravelling of the cut ends, without the need for tape or other expedients.

More specifically, it is an object of the invention to provide a manually-operated, heated cutting and sealing tool of the above type, which is adapted to cut in any direction, even along complex curvatures, and which has a handle whose orientation is parallel to the cutting edge of the tool to facilitate such cutting operations.

Also an object of the invention is to provide a tool whose blade incorporates a shoe whereby the material may be cut and sealed without laying it down on a platen or other support.

Briefly stated, these objects are accomplished in a cutting and sealing tool having a blade secured at an angle to a shank which is receivable within and extends axially from an elongated heating element, the element being attached by an angled rod to a handle, the angle of the rod being such as to dispose the handle in parallel relation to the cutting edge of the blade, whereby when the tool is used the handle is parallel to the plane of the backing being cut.

For a better understanding of the invention, as well as other objects and further features thereof, reference is made to the following detailed description to be read in conjunction with the accompanying drawing, wherein:

FIG. 1 is an elevational view of the tip of a cutting and sealing tool in accordance with the invention;
FIG. 2 is a plan view showing the edge of the cutting and sealing tool blade;
FIG. 3 shows the entire tool in perspective;
FIG. 4 illustrates the tool in operation; and
FIG. 5 shows a modified form of blade which incorporates a shoe.

Referring now to the drawing, the tool in accordance with the invention includes a removable tip constituted by a blade 10, of a metal having a high thermal conductivity, such as copper or brass, mounted on a shank 12 formed of a metal having similar properties. The blade has a semicircular shape, the straight edge 11 thereof being honed to have sloping sides and to provide a relatively sharp cutting surface. The extremities 11a and 11b of edge 11 are chamfered to facilitate longitudinal movement of the blade in either direction.

Blade 10 is received within a slot 12a cut into the front end of the cylindrical shank 12, the blade being rigidly secured to the shank by rivets 13. The blade is disposed so that its edge 11 lies at an acute angle to the longitudinal axis of the shank, which angle in practice may be 30°.

The other end of the shank 12 is received within the coupling head or socket 14 of a tubular electrical heating element 15, of the type commonly used in soldering irons, the element being provided with a perforated casing to dissipate heat. The shank is held in the socket by set screws 16 or similar means, so that when repair or replacement is necessary the entire tip may be removed.

Heating element 15 is mounted on a handle 17 by means of an angled tubular rod 18 through which the cable 19 to the heater element extends. The angle of the rod 18 is made such that the longitudinal axis of the handle 17 runs parallel to the cutting edge 11 of the blade.

Thus as shown in FIG. 4, when the tool is used to cut a woven backing B, the tool is held by the handle, by the user, and the handle then occupies a position which is parallel to the plane of the backing. In this way, the tool may be readily moved in any direction, and cutting may be effected in a curved or straight path, as desired.

The heat conveyed to the blade by the heater element serves to soften the synthetic thermoplastic yarns of the backing, whereby the backing is readily penetrated by the cutting edge. At the same time, the softened cut ends of the warp and woof yarns, being subjected to pressure by the sloping side of the cutting edge, fuse together, thereby sealing the cut ends of the yarns and preventing unravelling thereof. The slope of the sides of the cutting edge is preferably about 45°.

The blade 20 shown in FIG. 5 differs from that in FIG. 1, in that attached to the straight edge thereof is a shoe 21 of the same length, the edge being relieved to form a cutting surface 22 and defining a slot 23 which extends for a portion of the length of the edge. In FIG. 4, it is necessary, when cutting with a tool of the type shown in FIG. 1, to place the backing on a platen or base, but with the blade shown in FIG. 5, one has merely to insert the backing between the shoe 21 and the cutting surface in slot 23, and to move the blade forwardly, whereby cutting takes place at the junction between the cutting surface and the shoe.

While there has been shown and described a preferred embodiment of a cutting tool for woven backings of synthetic material in accordance with the invention, it will be appreciated that many changes and modifications may be made therein without, however, departing from the essential spirit of the invention as defined in the annexed claims.

What I claim is:
1. A cutting tool for woven material formed by thermoplastic synthetic yarns, said tool acting simultane- ously to cut said material and to fuse the cut ends of said yarns to prevent unravelling of said material, said tool comprising:
  (A) an elongated cylindrical electrical heating element having a coupling head at one end thereof,
  (B) a removable tip constituted by a shank one end of which is receivable in said coupling whereby said shank extends axially from said element head, and a blade secured to the other end of said shank, said blade having a straight cutting edge disposed at an angle of the axis of said shank, said blade including means for applying pressure on the ends of the material being cut, said means being defined by converging faces forming said cutting edge, said faces being inclined at an angle of approximately 45° with the plane of the blade, and
  (C) a handle secured to the other end of said element at an angle thereto at which the longitudinal axis of the handle lies substantially parallel to the cutting edge of the blade, the angle of the cutting edge and the length of the heater element being such as to produce a spacing between the handle and the cutting edge sufficient to allow clearance between the hand of the operator holding the handle and the woven material therebelow, whereby the tool may be moved in any direction.

2. A cutting tool for woven material formed by thermoplastic synthetic yarns, said tool acting simultaneously to cut said material and to fuse the cut ends of said yarns to prevent unravelling of said material, said tool comprising:
  (A) an elongated cylindrical electrical heating element having a coupling head at one end thereof,
  (B) a removable tip constituted by a shank one end of which is receivable in said coupling whereby said shank extends axially from said element head, and a blade secured to the other end of said shank, said blade having a straight cutting edge disposed at an angle to the axis of said shank, said cutting edge being defined by sloping the straight edge of said blade to form a triangular cross-section whose sides act to impose pressure on the material being cut,
  (C) a handle secured to the other end of said element at an angle thereto at which the longitudinal axis of the handle lies substantially parallel to the cutting edge of the blade, the angle of the cutting edge and the length of the heater element being such as to produce a spacing between the handle and the cutting edge sufficient to allow clearance between the hand of the operator holding the handle and the woven material therebelow, whereby the tool may be moved in any direction, and
  (D) said blade further including a shoe secured to the straight edge of the blade, the blade being relieved along said straight edge to define a cutting surface at the junction of said straight edge and said shoe.

References Cited
UNITED STATES PATENTS

| | | | |
|---|---|---|---|
| 1,530,794 | 3/1925 | Swan | 30—294 |
| 2,701,835 | 2/1955 | Anton | 30—140 |
| 2,284,343 | 5/1942 | Weiskopf | 30—140 |
| 2,379,863 | 7/1945 | Caldwell | 30—229 |
| 3,018,550 | 1/1962 | Lefevre | 30—140 |

OTHELLO M. SIMPSON, *Primary Examiner.*

W. FELDMAN, *Examiner.*

G. WEIDENFELD, *Assistant Examiner.*